US008429968B2

(12) United States Patent
Allen, IV et al.

(10) Patent No.: US 8,429,968 B2
(45) Date of Patent: Apr. 30, 2013

(54) BALANCE TEST INDEXING TOOL FOR BALANCE-TESTING A ROTOR

(75) Inventors: George I Allen, IV, Elmore, VT (US); Anderson S Leveille, Stowe, VT (US)

(73) Assignee: Moscow Mills, Inc., Stowe, VT (US)

( * ) Notice: Subject to any disclaimer, the term of this patent is extended or adjusted under 35 U.S.C. 154(b) by 481 days.

(21) Appl. No.: 12/748,499

(22) Filed: Mar. 29, 2010

(65) Prior Publication Data

US 2011/0083505 A1 Apr. 14, 2011

Related U.S. Application Data

(60) Provisional application No. 61/249,710, filed on Oct. 8, 2009.

(51) Int. Cl.
*G01M 1/02* (2006.01)
(52) U.S. Cl.
USPC .......................................................... 73/487
(58) Field of Classification Search ...................... 73/487
See application file for complete search history.

(56) References Cited

U.S. PATENT DOCUMENTS

| 3,871,234 | A |   | 3/1975  | Langlois          |
|-----------|---|---|---------|-------------------|
| 4,072,028 | A | * | 2/1978  | Connell ...... 464/54 |
| 4,177,692 | A |   | 12/1979 | Irwin             |
| 4,419,894 | A | * | 12/1983 | Matumoto ...... 73/462 |
| 4,462,253 | A |   | 7/1984  | Becher            |
| 4,574,749 | A |   | 3/1986  | Negre             |
| 5,074,723 | A |   | 12/1991 | Massa et al.      |
| 5,167,167 | A |   | 12/1992 | Tiernan, Jr. et al. |
| 5,461,791 | A |   | 10/1995 | Piety             |
| 5,996,336 | A |   | 12/1999 | Hamedani          |
| 6,325,351 | B1 |  | 12/2001 | Hale et al.       |
| 6,481,281 | B1 |  | 11/2002 | Gerdes            |
| 6,729,589 | B2 |  | 5/2004  | Shelef            |
| 6,746,172 | B2 |  | 6/2004  | Culpepper         |
| 6,962,080 | B2 |  | 11/2005 | Robbins           |
| 7,412,884 | B2 |  | 8/2008  | Feldmann et al.   |
| 7,422,107 | B2 |  | 9/2008  | Burns et al.      |
| 2009/0097965 | A1 | | 4/2009 | Swanson et al.   |

FOREIGN PATENT DOCUMENTS

| JP | 01200002 A | 8/1989 |
| JP | 07209130 A | 8/1995 |

(Continued)

OTHER PUBLICATIONS

International Search Report and Written Opinion dated Jun. 8, 2011 for related application PCT/US2010/051925 filed Oct. 8, 2010 entitled "Balance Test Indexing Tool for Balance-Testing a Rotor," Moscow Mills, Inc. et al.

(Continued)

*Primary Examiner* — Hezron E Williams
*Assistant Examiner* — Gregory J Redmann
(74) *Attorney, Agent, or Firm* — Downs Rachlin Martin PLLC (57) ABSTRACT

A balance test indexing tool for use in a balance testing machine to assist a user in testing unbalance in a rotor. The tool includes a rotor mount that is temporarily affixed to the rotor being tested. The tool also includes a rotor mount receiver configured to receive the rotor mount and the rotor in the balance testing machine. The rotor mount and rotor mount receiver are configured to provide an indexing coupling that allows the rotor to be readily indexed to any of a plurality of index positions for unbalance testing in the testing machine. The tool allows multiple balancing runs to be made with relatively little effort needed to re-index the rotor. In some embodiments the tool includes a kinematic coupling that provides highly accurate and repeatable indexing.

17 Claims, 9 Drawing Sheets

FOREIGN PATENT DOCUMENTS

| | | |
|---|---|---|
| JP | 7104220 B2 | 11/1995 |
| JP | 2003227771 A | 8/2003 |
| JP | 2007183203 A | 7/2007 |

OTHER PUBLICATIONS

Lee, Jung Kwan; Lee, Sang Bong; Moon, Hyungpil; Oh, Dongho; and Koo, J.C.; "An enhanced real-time dynamic imbalance correction for precision rotors," Journal of Mechanical Science and Technology; 23 (2009) pp. 1050-1053; Mar. 16, 2009.

Muller, Peter C.; "Modelling and control of mechatronic systems by the descriptor approach," Journal of Theoretical and Applied Mechanics; 43, 3, pp. 593-607, Warsaw 2005; accepted May 16, 2005.

Culpepper, Martin L.; "Design of quasi-kinematic couplings," Science Direct; Precision Engineering 28 (2004) pp. 338-357; accepted Dec. 16, 2002.

\* cited by examiner

BALANCE TEST INDEXING TOOL FOR BALANCE-TESTING A ROTOR

RELATED APPLICATION DATA

This application claims the benefit of priority of U.S. patent application Ser. No. 61/249,710, filed on Oct. 8, 2009, and titled "Balance Test Indexing Tool for Balance-Testing a Rotor," which is incorporated herein by reference in its entirety.

FIELD OF THE INVENTION

The present invention generally relates to the field of balance testing of rotating parts. In particular, the present invention is directed to a balance test indexing tool for balance testing a rotor.

BACKGROUND

Rotors of many types of rotational machinery need to be balanced to ensure smooth operation and longevity. For example, turbine and compressor rotors of gas turbines and impellers of pumps require balancing to correct any unbalance as part of initial manufacturing and often in connection with periodic maintenance. These rotors can span a broad range of sizes and weights, and those that are very large, for example, weighing hundreds to thousands of pounds, can make balance testing and balance correction challenging, time consuming and expensive.

SUMMARY OF THE DISCLOSURE

In one implementation, the present disclosure is directed to a system. The system includes: a balance test indexing tool for assisting with balance-testing a rotor of machinery using a balance testing machine having a drive mechanism, the balance test indexing tool including: a rotor mount configured to be fixedly secured to the rotor; and a rotor mount receiver configured to be coupled between the drive mechanism of the balance testing machine and the rotor mount; wherein the rotor mount and the rotor mount receiver cooperate with one another to provide an indexing coupling between the drive mechanism and the rotor when the rotor, the rotor mount and the rotor mount receiver are installed in the balance testing machine.

In another implementation, the present disclosure is directed to a system. The system includes: a modular balance test indexing tool system for assisting with balancing a rotor of machinery on a balance testing machine having a drive mechanism, the modular balance test indexing tool system including: a rotor mount configured to be fixedly secured to the rotor; a balance testing machine arbor configured to be coupled between the drive mechanism of the balance testing machine and the rotor mount, wherein the rotor mount and the balance testing machine arbor cooperate with one another to provide a first indexing coupling between the drive mechanism and the rotor when the rotor, the rotor mount and the arbor are installed in the balance testing machine; and a balancing simulator configured to be coupled between the drive mechanism of the balance testing machine and the rotor mount, wherein the rotor mount and the balancing simulator cooperate with one another to provide a second indexing coupling between the drive mechanism and the rotor.

In still another implementation, the present disclosure is directed to a system. The system includes: a balance testing machine having a drive mechanism; a rotor for a piece of machinery, the rotor being installed in the balance testing machine; a balance test indexing tool for assisting with balance testing the rotor in the balance testing machine, the balance test indexing tool coupled between the drive mechanism and the rotor and including: a rotor mount fixedly secured to the rotor; and a rotor mount receiver coupled between the drive mechanism and the rotor mount; wherein the rotor mount and the rotor mount receiver cooperate with one another to provide an indexing coupling between the drive mechanism and the rotor.

In yet another implementation, the present disclosure is directed to a method. The method includes: providing a rotor of a piece of machinery; fixedly securing a rotor mount to the rotor so as to form an assembly; and coupling the rotor mount to a rotor mount receiver so as to form an indexing coupling between the rotor and the rotor mount receiver.

In still yet another implementation, the present disclosure is directed to a method. The method includes: providing a balance testing machine; providing a rotor of a piece of machinery; providing a balance test indexing tool; setting the rotor at a first index position using the balance test indexing tool; operating the balance testing machine to spin the balance test indexing tool and the rotor so as to test the rotor for unbalance at the first index position; setting the rotor at a second index position, different from the first index position, using the indexing tool; and operating the balance testing machine to spin the balance test indexing tool and the rotor so as to test the rotor for unbalance at the second index position.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
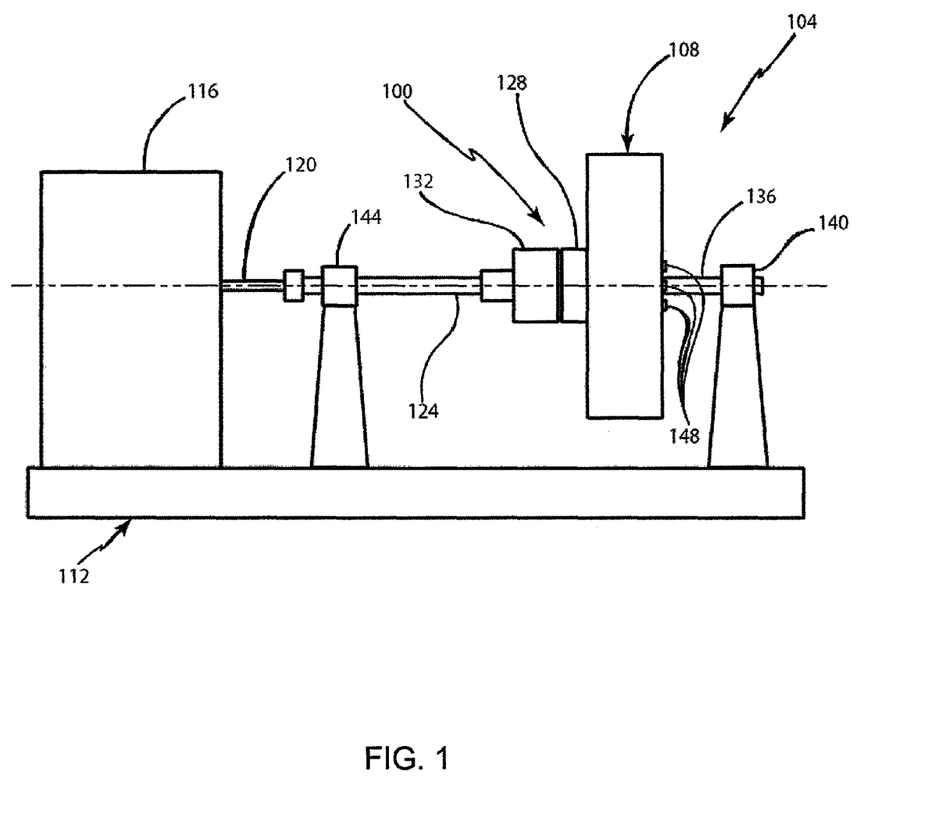
FIG. 1 is a side elevational view of a balance test indexing tool incorporated into a balancing system for testing unbalance of a rotor.

Referring now to the drawings, FIG. 1 illustrates a balance test indexing tool 100 in the context of an overall balancing system 104 in which a rotor 108 is being tested for unbalance using a balance testing machine 112. As will be described below in detail, tool 100 allows a user to readily and accurately set, or index, rotor 108 to differing index positions throughout a testing procedure, as well as to achieve very high repeatability, in terms of precision, for all of the index positions. As those skilled in the art will readily appreciate after reading this entire disclosure, use of tool 100 can significantly reduce the time it takes not only to perform unbalance testing, but also to correct any unbalance in a rotor, such as rotor 108. For example, during testing, rotor 108 can be readily re-indexed from a current index position to a new index position without the need to remove and re-fix an arbor to the rotor, as is typically done in conventional processes. As another example, after unbalance in rotor 108 is detected using tool 100 and after the rotor is modified to correct the unbalance, the rotor can be reinstalled and precisely indexed, using the tool, to the index positions used during an earlier test. Thus, another balancing test can be performed with very high repeatability of the indexing. Examples illustrating these and other features of a balance test indexing tool of the present disclosure, such as tool 100, are described below. First, however, other components of system 104 are further described for context.

As those skilled in the art will readily appreciate, rotor 108 can be any one of a vast variety of rotating structures, such as a compressor, turbine, or component thereof (e.g., a blade assembly) of a gas turbine (e.g., a jet engine), an impeller of a pump, a flywheel, and virtually any other rotating structure of a piece machinery that can be negatively impacted by the rotor being unbalanced during operation. Consequently, as used herein and in the appended claims, the term "rotor" shall mean a body that is a component of an assembly or the assembly itself designed to rotate when in service and that, during the process of balancing the rotor, may require special tooling to adapt it to a balancing machine. While balance test indexing tool 100 can be adapted for use with virtually any size and weight of rotor 108, it can be particularly beneficial for rotors where, because of their weight, geometry, repair/replacement costs, traditional balancing methods increase risk.

Balance testing machine 112 can be virtually any machine suitable for balance testing rotor 108, such as a conventional balance testing machine. Examples of standards for balancing-machine and balance-testing standards for the aerospace industry include the aerospace recommended practices (ARP) of the Society of Automotive Engineers (SAE) SAE ARP 587, SAE ARP 588, SAE ARP 4048 and SAE ARP 4050, among others. Other industries may have similar standards for various types of rotors. Balance testing machine 112 and its use may conform to any one or more of these standards or other practices. Balance testing machine 112 includes a drive mechanism 116 having an output shaft 120 that spins rotor 108 during testing. Drive mechanism 116 can be any suitable drive mechanism, such as a direct-drive variable-speed motor, an electric motor/variable transmission combination, a belt-driven mechanism or a chain-driven mechanism, among others. In this example, output shaft 120 is coupled to a balancing arbor 124, which in turn is coupled to balance test indexing tool 100. In other embodiments, output shaft 120 can be coupled directly to tool 100 or to a balancing simulator (not shown) that is coupled between the output shaft and the tool. As those skilled in the art will understand, a balancing simulator is used in some unbalance testing to simulate one or more parts that will rotate with the rotor being tested when the rotor is in the assembled machinery but are not present during testing. A balancing simulator is an attachment of adequate stiffness and of the same dynamic characteristics (center-of-mass, mass, and moments of inertia) as the rotor, or part of the rotor, it replaces. It should be understood that the term "balancing simulator" and like terms used herein and in the appended claims are intended to cover the devices that are also known by other names, such as "PMIs" (Polar Moment Inertia) and "dummy rotors."

In this example, tool 100 includes a rotor mount 128 and a rotor mount receiver 132. Rotor mount 128 is fixedly secured to rotor 108 using any suitable fixing technique, such as shrink fitting the rotor onto the rotor mount to create a tight friction fit or using hydraulically actuated segments integrated into the rotor mount, among others. Importantly, and as described below in more detail, rotor mount 128 can remain in fixed engagement with rotor 108 during multi-index testing and/or during testing and retesting sequences. In this example, rotor mount receiver 132 is fixedly secured to balancing arbor 124 and rotor 108 has a central aperture (not shown) that receives a spindle (not shown) when the rotor is assembled into the finished machinery. To accommodate this configuration of rotor 108, rotor mount receiver 132 includes a through-shaft 136 that extends through the rotor's central aperture and engages a corresponding rotational bearing 140 on balance testing machine 112. Rotor 108 is supported on its opposite side by rotational bearing 144 on balance testing machine 112.

Rotor mount 128 and rotor mount receiver 132 are movable relative to one another so that rotor 108 can be indexed at more than one index position relative to the rotor mount receiver. In this example, rotor mount 128 and rotor mount receiver 132 are configured with three index positions located 120° apart from one another. In other embodiments, a balance test indexing tool made in accordance with the present disclosure can have any number of index positions. The index positions can be defined by discrete indexing stops or may not have any stops so as to allow rotor 108 to be indexed to any of an infinite number of index position. In this example, a set of threaded fasteners 148 are used to hold rotor mount 128 and rotor mount receiver 132 into firm engagement with one another so as to secure rotor 108 in its current index position. To change rotor 108 from one index position to another, fasteners 148 are removed, the rotor and rotor mount 128 are rotated to a different index position and the fasteners are reinstalled. Similarly, if rotor 108 is to be removed from balance testing machine 112 before further testing is performed, for example, to modify the rotor, fasteners 148 are removed so that just the rotor and rotor mount 128 can be removed. Rotor 108 (along with rotor mount 128 still fixed to the rotor) and fasteners 148 can then be reinstalled to balance testing machine 112 with the rotor in the desired index position, relative to rotor mount receiver 132, which can be the same index position it was in before it was removed from the balance testing machine. In other embodiments, other securing means can be used in place of fasteners 148 to suit a particular design.

As discussed below, rotor mount 128 and rotor mount receiver 132 can be configured to provide a kinematic coupling or a quasi-kinematic coupling between rotor 108 and drive mechanism 116 when the rotor mount and receiver are engaged with one another. As known in the art, a kinematic coupling traditionally provides six points of support that provide exact constraint, i.e., the desired constraint without redundancy. Perhaps most common among kinematic couplings is the 3-ball/3-groove configuration in which one component of the coupling has three "balls" circumferentially spaced 180° center-to-center and the other component has three corresponding radial grooves also circumferentially spaced 180° center-to-center. When the balls are seated in the corresponding respective grooves, exactly six points of contact exist between the balls and sidewalls of the grooves. It is noted that while the one set of features is traditionally called "balls" because they are often spherical in shape, similar features of other shapes, such as frusto-conical, elipsoidal, etc. are also commonly referred to as "balls." Therefore, the use of the term "balls" throughout this disclosure and in the appended claims in the context of kinematic couplings is intended to cover all shapes of such like-function features. Kinematic couplings provide sub-micron alignment accuracy and very high alignment repeatability. An example of a kinematic coupling suitable for use in a balance test indexing tool of the present disclosure, such as tool 100, can be found in U.S. Pat. No. 6,746,172 to Culpepper, titled "Apparatus And Method For Accurate, Precise, And Adjustable Kinematic Coupling," which is incorporated by reference herein for its teachings on kinematic couplings.

Quasi-kinematic couplings are very similar to kinematic couplings, but use arc-shaped contact regions rather than point contacts. These arc-shaped regions provide somewhat less defined constraints, but properly designed quasi-kinematic couplings can provide sub-micron alignment accuracy and very high alignment repeatability, just like exact-constraint kinematic couplings. Further details of kinematic and quasi-kinematic couplings can be found in M. L. Culpepper, "Design of quasi-kinematic couplings," *Precision Engineering* 28 (2004) 338-357, which is incorporated herein by reference for its teachings on kinematic and quasi-kinematic couplings. Because of the similarities between kinematic and quasi-kinematic couplings, from this point on and in the appended claims and abstract the term "kinematic coupling" is intended to cover kinematic and quasi-kinematic couplings. Several detailed examples of balance test indexing tools incorporating kinematic couplings are described below.

Figure 2:
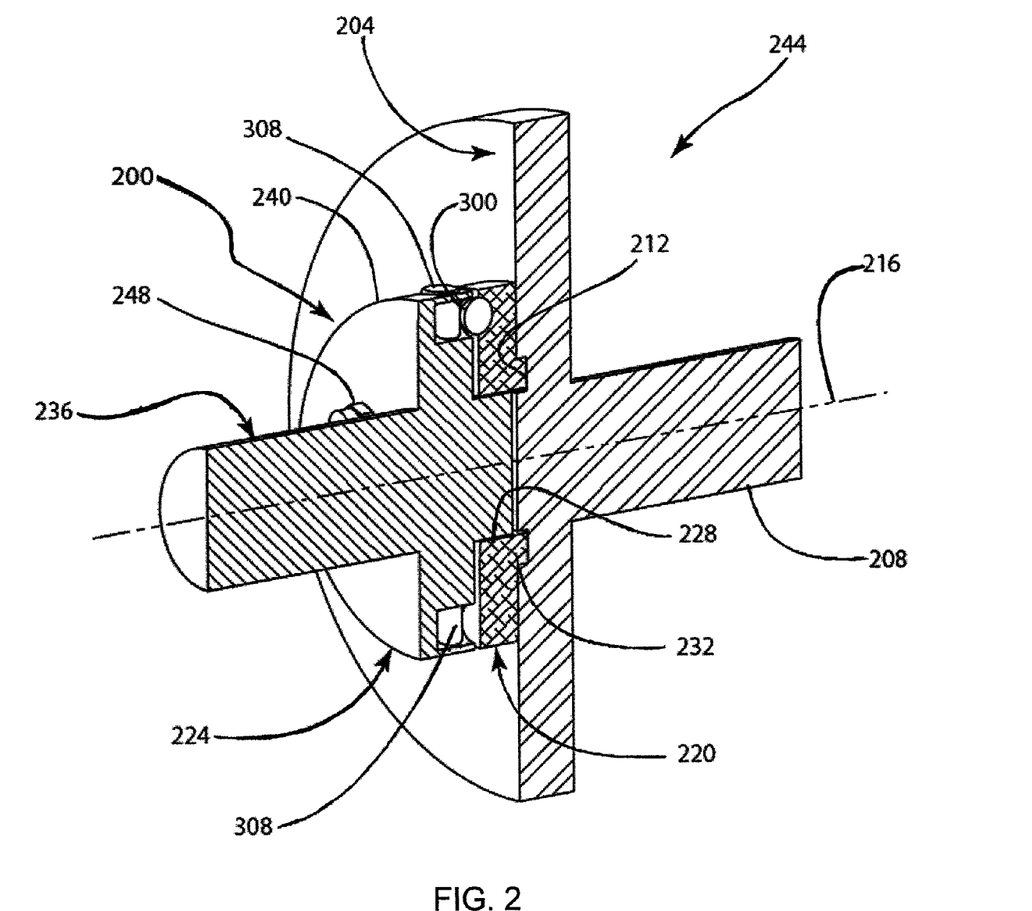
FIG. 2 is longitudinal cross-sectional isometric view of a rotor and a balance test indexing tool engaged with the rotor.
Figure 3:
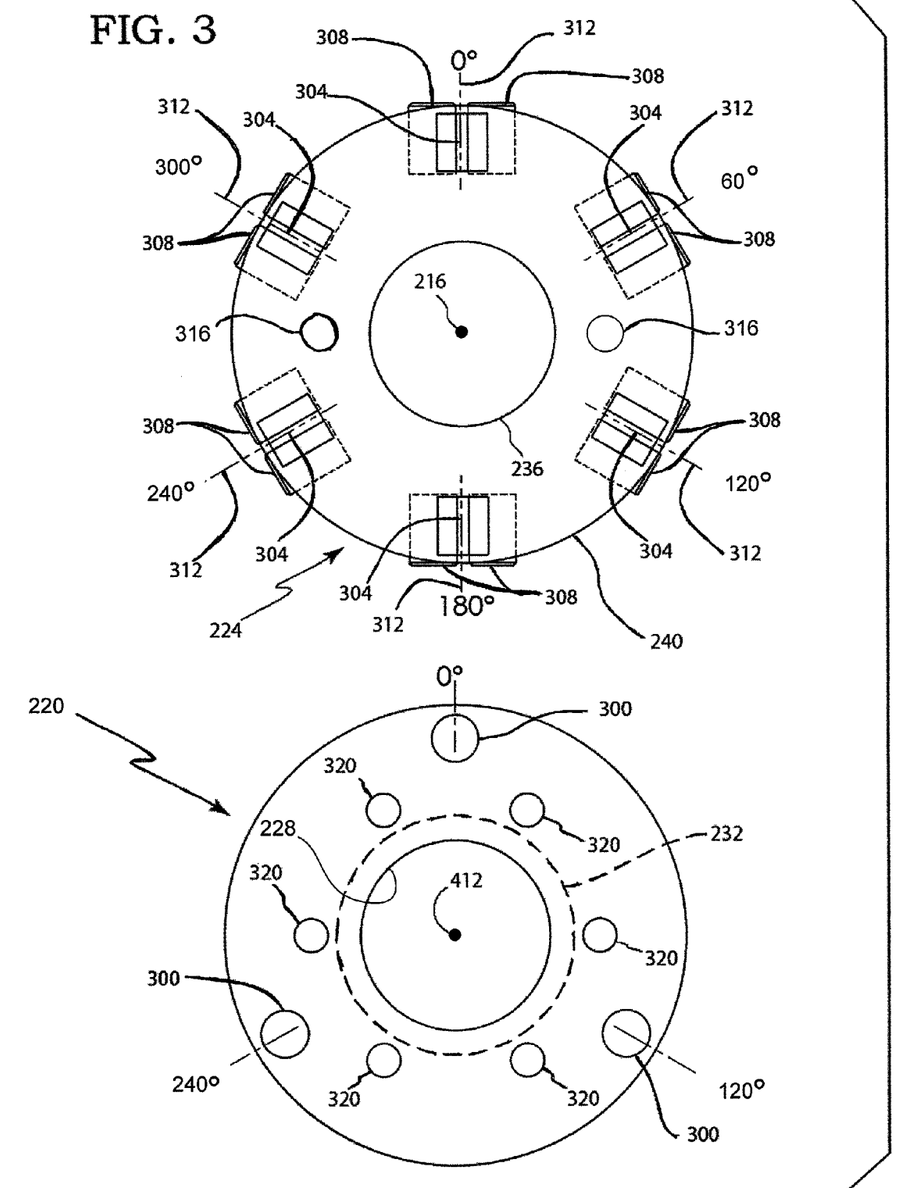
FIG. 3 contains enlarged axial views of the rotor mount and rotor mount receiver of FIG. 2 showing their kinematic coupling features.

Referring now to FIGS. 2 and 3, these figures illustrate a balance test indexing tool 200 suitable for use with a "half-shaft" (or "stub shaft") rotor (with a shaft on only one side of the rotor), such as half-shaft rotor 204 shown in FIG. 2. As with rotor 108 of FIG. 1, rotor 204 can be a rotor from any of a variety of pieces of machinery. In this example, rotor 204 includes an axle 208 and has a circular groove 212 concentric with the rotational axis 216 of the rotor. Balance test indexing tool 200 includes a rotor mount 220 and a rotor mount receiver 224. As seen in FIG. 2, rotor mount 220 is largely disk-shaped and has a central aperture 228 concentric with rotational axis 216 of rotor 204. In this example, a cylindrical flange 232 is provided to secure rotor mount 220 to rotor 204 via a friction fit within circular groove 212 in the rotor. As those skilled in the art will readily appreciate, the friction fit can be achieved, for example, using a shrink-fit technique that involves heating (or cooling) one or the other of rotor mount 220 and rotor 204 relative to the other, engaging flange 232 with groove 212 and allowing the two components to reach an equilibrium temperature so that a friction fit is obtained between the flange and sidewall of the groove.

As best seen in FIG. 2, rotor mount receiver 224 includes a half-shaft 236 and an integral coupling portion 240. Half-shaft 236 cooperates with axle 208 to provide the entire assembly 244 with support points on both sides of rotor 204 for mounting in a balance testing machine, such as balance testing machine 112 of FIG. 1, or other balance testing machine. Coupling portion 240 engages rotor mount 220, in this example, to provide a discrete-indexing-position type indexable coupling. More specifically, in this example rotor mount 220 and coupling portion 240 are configured to provide six index positions for rotor 204 relative to rotor mount receiver 224 using kinematic coupling features.

Referring now primarily to FIG. 3, the kinematic coupling features on rotor mount 220 are three spherical balls 300 spaced circumferentially 120° center-to-center. Coupling portion 240 includes six radial cavities 304 circumferentially spaced 60° center-to-center. Each cavity 304 is associated with a corresponding set of two parallel pins 308 spaced equally from the radial centerline 312 of that cavity. When rotor mount 220 is properly engaged with coupling portion 240 of rotor mount receiver 224, the three balls 300 engage three corresponding respective ones of the six cavities 304 in a skip pattern and contact each of six corresponding ones of pins 308 at only a single point so as to achieve an exact kinematic constraint condition. As those skilled in the art will readily understand, since balls 300 are spaced at 120° center-to-center and cavities 304 and pin pairs are spaced at 60° center-to-center, the balls can engage the cavities in a manner that provides six index positions at 0°, 60°, 120°, 180°, 240° and 300°. Once a desired index position has been selected and set, rotor mount 220 is firmly drawn into engagement with coupling portion 240 of rotor mount receiver 224 using a pair of bolts 248 (only one is shown in FIG. 2, but in this example there are two bolts corresponding to bolt holes 312 in coupling portion 240 in FIG. 3). Rotor mount 224 has six threaded bolt holes 320 for receiving bolts 248 and are located so as to accommodate all six index positions.

Figure 4:
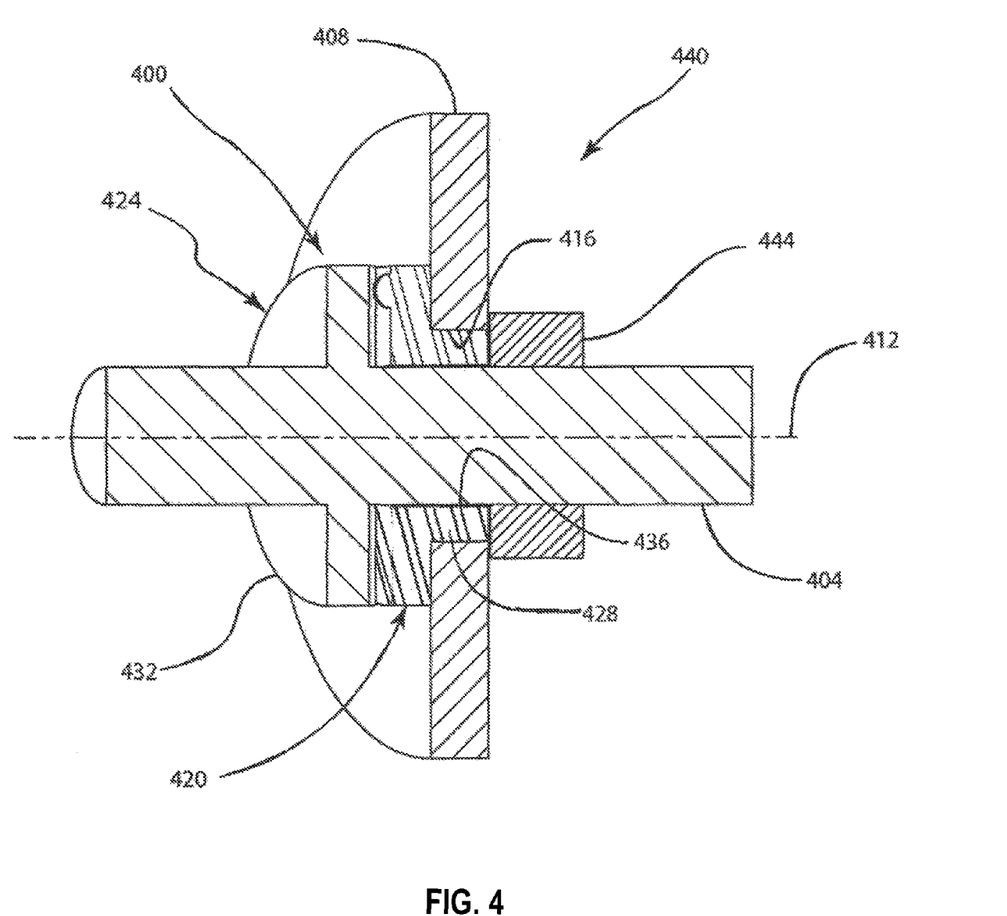
FIG. 4 is a longitudinal cross-sectional isometric view of another rotor and another balancing index tool engaged with the rotor.
Figure 5:
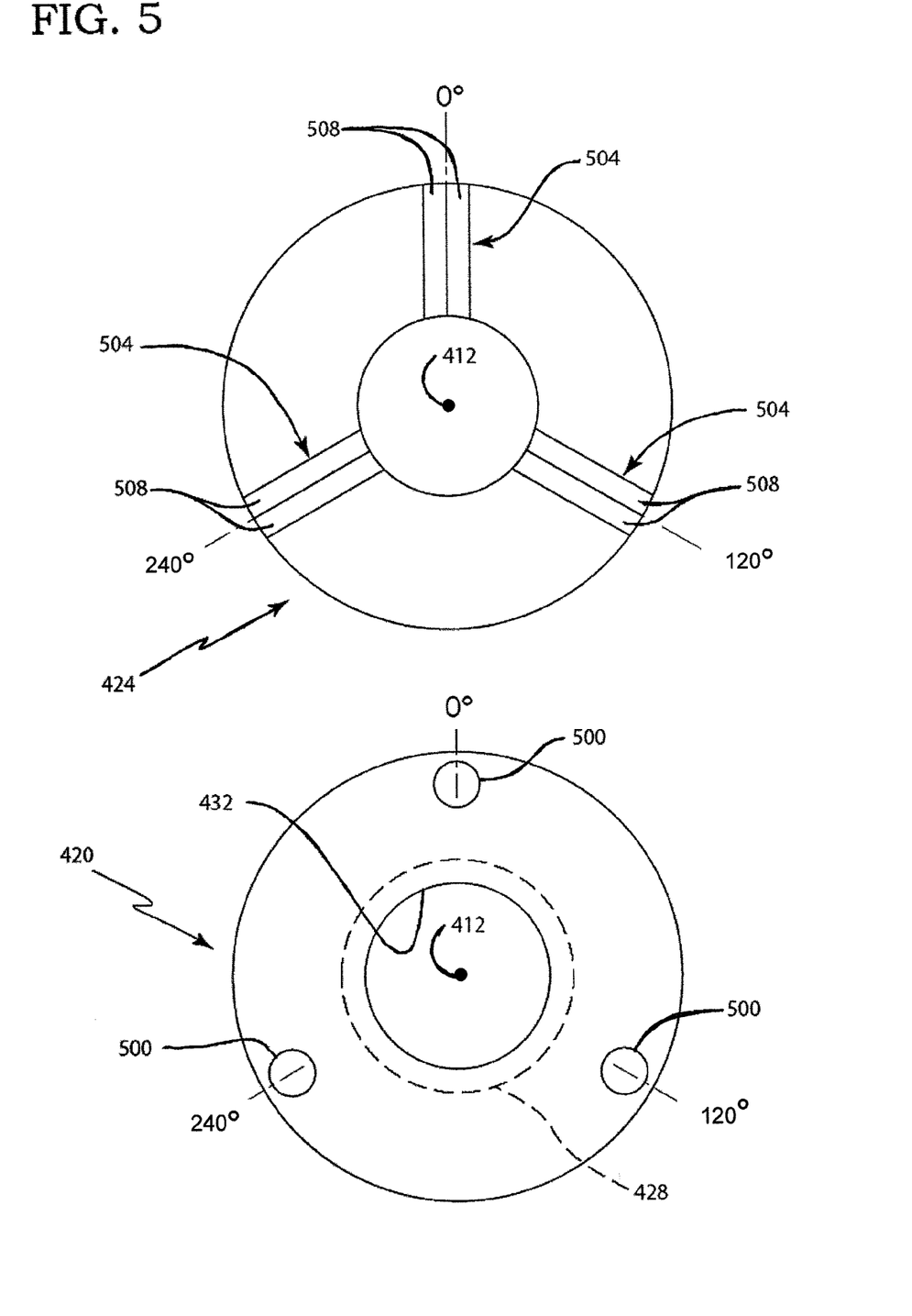
FIG. 5 contains enlarged axial views of the rotor mount and rotor mount receiver of FIG. 4 showing their kinematic coupling features.

FIGS. 4 and 5 illustrate a balance test indexing tool 400 that has a through-shaft 404 for accommodating a shaftless rotor, such as rotor 408 of FIG. 4, which may be a rotor of any of a variety of machines. Referring first to FIG. 4, rotor 408 is designed to rotate about rotational axis 412 and includes a central aperture 416 that receives a spindle (not shown) in the assembled machine of which it is part. Tool 400 includes a rotor mount 420 and a rotor mount receiver 424. Rotor mount 420 has a cylindrical flange 428 that is engaged with rotor 408 via a friction fit within aperture 416 that firmly and fixedly secures the rotor mount to the rotor. This friction fit can be effected using a shrink-fit technique. Alternative ways of fixing rotor mount 420 to rotor 408 include providing flange 428 with hydraulically movable segments that are actuated to firmly engage the inner periphery of aperture 416. If rotor 408 were to have bolt holes surrounding aperture 416 for connecting the rotor to a flanged mount on a spindle, flange 428 could be eliminated from rotor mount 420 and the rotor could be bolted directly to the rotor mount using, for example, a set of threaded holes that match ones of the bolt holes in the rotor. Other ways of affixing rotor mount 420 to rotor 408 can also be used.

Rotor mount receiver 424 includes through-shaft 404 and a coupling portion 432 integral with the through-shaft. Through-shaft 404 extends through a central aperture 436 in rotor mount 420 and has a length selected to accommodate the support spacing of the balance testing machine (not shown) in which the assembly 440 will be installed for unbalance testing. Coupling portion 432 may be monolithic with through-shaft 404 or, alternatively, may be formed as a separate component that is subsequently fixed to the through-shaft. In this example, rotor mount 420 and coupling portion 432 of rotor mount receiver 424 include kinematic coupling features that provide tool 400 with six index positions for rotor 408.

As seen best in FIG. 5, the kinematic coupling features on rotor mount 420 are three spherical balls 500 spaced circumferentially 120° center-to-center. Coupling portion 432 includes three radial V-grooves 504 also circumferentially spaced 120° center-to-center. When rotor mount 420 is properly engaged with coupling portion 432 of rotor mount receiver 424, the three balls 500 engage corresponding respective ones of V-grooves 504 and contact each of the corresponding side walls 508 at only a single point so as to achieve an exact kinematic constraint condition. As those skilled in the art will readily understand, since balls 500 are spaced at 120° center-to-center and V-grooves 504 are spaced at 120° center-to-center, the balls can engage the V-grooves to provide three index positions at 0°, 120° and 240°. Once a desired index position has been selected and set, rotor mount 420 is firmly biased into engagement with coupling portion 432 of rotor mount receiver 424 using a nut 444 (FIG. 4) threadedly engaged with through-shaft 404.

Figure 6:
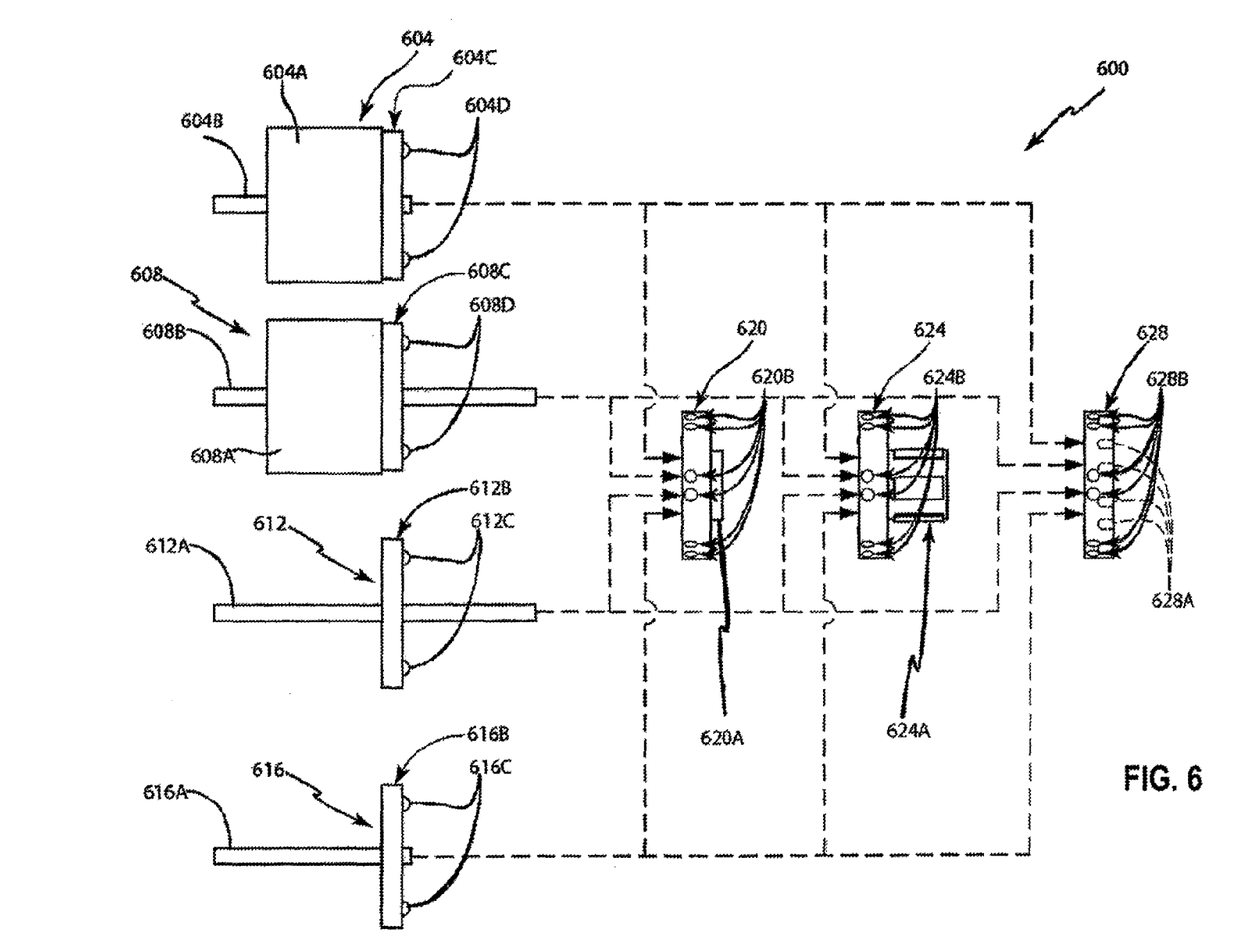
FIG. 6 is a diagram illustrating a modularized balance test indexing tool system having interchangeable components.

FIG. 6 illustrates a modular balance test indexing tool system 600 that can be useful in minimizing the time for performing balancing operations on a number of rotors (not shown) of differing types and/or configurations. For the sake of illustration, in this example modular system 600 includes four rotor mount receivers 604, 608, 612, 616 and three rotor mounts 620, 624, 628. Rotor mount receivers 604, 608 are of the simulator type mentioned above in connection with FIG. 1, whereas rotor mount receivers 612, 616 are of a non-simulator type. As mentioned above, some unbalance testing is performed using a simulator to simulate one or more portions of a finished rotating structure that are not present during testing. Such simulators are configured to match, or nearly match, the rotational characteristics of the not-present portion(s). Consequently, rotor mount receivers 604, 608 each have a simulator portion 604A, 608A, as well as a shaft stub 604B, 608B for engaging a balance testing machine support (not shown) and a coupling portion 604C, 608C for coupling that receiver with any one of rotor mounts 620, 624, 628. A primary difference between rotor mount receivers 604, 608 is that receiver 604 is intended for a half-shaft rotor, whereas receiver 608 is intended for a shaftless rotor. Similarly, rotor mount supports 612, 616 are intended for a shaftless rotor and a half-shaft rotor, respectively. As mentioned above, rotor mount supports 612, 616 are of the non-simulator type and, so, do not include simulator portions as in supports 604, 608. Consequently, rotor mount receiver 612, 616 include a relatively small diameter central shaft 612A, 616A suitable for engaging one or more balance testing machine supports and a coupling portion 612B, 616B for coupling that receiver with any one of rotor mounts 620, 624, 628. Rotor mount receivers 612, 616 are suitable for unbalance testing when a simulator is not necessary or desired.

Rotor mounts 620, 624, 628 are configured for engaging different rotors. For example, rotor mount 620 includes a cylindrical flange 620A for engaging, for example, a circular groove in a half-shaft rotor, like rotor mount 220 of FIG. 2. Rotor mount 624 includes a hydraulically actuated movable-segment gripper 624A for gripping, for example, the inner periphery of a central aperture in a shaftless rotor. This situation can be likened to the situation of rotor mount 420 of FIG. 4, except that the shrink fit is replaced by the grip by gripper 624A. It is noted that gripper 624A can be designed to accommodate apertures of differing diameters so that rotor mount 624 can be used for a variety of rotors without the need for a special mount for each rotor. Rotor mount 628 simply includes threaded fastener holes 628A for receiving threaded fasteners of a rotor having corresponding bolt holes. Such a rotor could be shaftless or have a half-shaft.

Each of coupling portions 604C, 608C, 612B, 616B and each of rotor mounts 620, 624, 628 includes indexing features that allow each one of rotor mount receivers 604, 608, 612, 616 to couple to each one of the rotor mounts in a manner that provides a balance test indexing tool for each such pair. In the example shown, each coupling portion 604C, 608C, 612B, 616B includes three balls 604D, 608D, 612C, 616C (only two visible in each coupling portion) similar to balls 300 of FIG. 3 and each rotor mount includes six pin-type ball receivers 620B, 624B, 628B (only four indicated in each mount) similar to the configuration of rotor mount 220 as shown in FIG. 3. As discussed above in connection with FIGS. 2 and 3, this particular configuration of indexing features provides a kinematic coupling having six index positions 60° apart from one another. Of course, these indexing features are merely illustrative, and those skilled in the art will appreciate that other types of features can be used, including features that provide infinite indexing adjustability. Those skilled in the art will also appreciate that the number of and types of rotor mounts and number and types of rotor mounts shown in FIG. 6 are merely exemplary, and that many other sizes and configurations of these components are possible while maintaining modularity.

Figure 7:
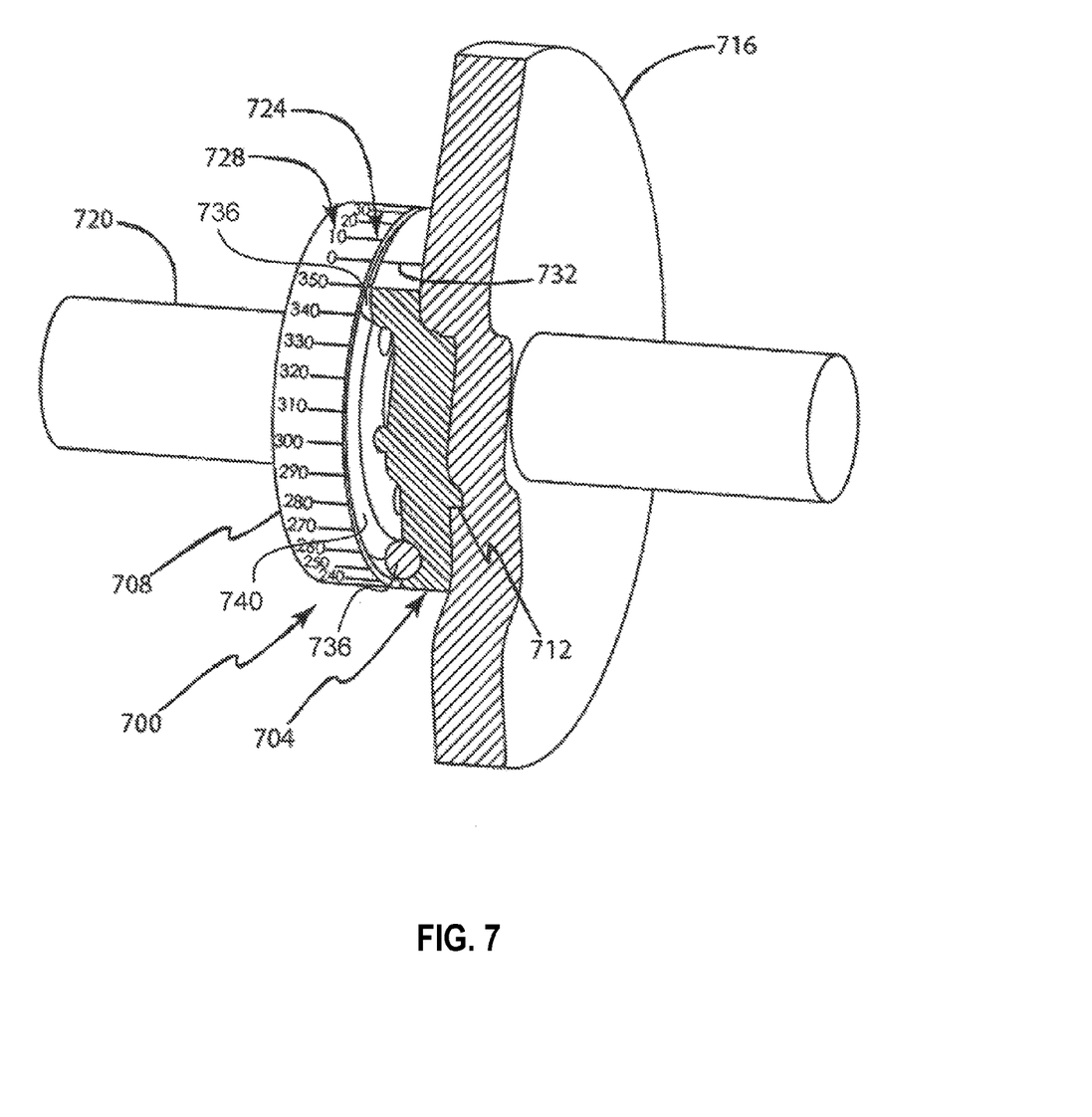
FIG. 7 is a partial cross-sectional isometric view of a test assembly that includes a balance test indexing tool having indexing indicia.

FIG. 7 illustrates a balance test indexing tool 700 that provides indexing in 20° increments. Tool 700 includes a rotor mount 704 and a rotor mount receiver 708. In this example, rotor mount 704 is similar to rotor mount 420 shown in FIG. 4, in that it has a similar cylindrical flange 712 for engaging a rotor, such as rotor 716. Rotor mount receiver 708 of this example is a bit different from rotor mount receivers 224, 424, 604, 608, 612, 616 shown in FIGS. 2-6 in that it is configured as an adapter of sorts for a plain arbor 720. With this configuration, rotor mount receiver 708 can be fixed to arbor 720 in any suitable manner, such as bolting. Tool 700 includes indexing indicia for assisting a user in selecting and setting up an index position for rotor 716 relative to rotor mount receiver 708.

In this example, indexing indicia includes tick marks 724 and angle values 728 on the outer periphery of rotor mount receiver 708 and a corresponding alignment mark 732 on the outer periphery of rotor mount 704. As those skilled in the art will appreciate, the indexing indicia shown in FIG. 7 is merely illustrative and other indicia may be used in other embodiments. In addition, the indicia shown can reversed, with tick marks 724 and angle values 728 being located on rotor mount 704 and alignment mark 732 being located on rotor mount receiver 708. Coupling features on rotor mount 704 and rotor mount receiver 708 include three balls 736 (only one seen in the FIG. 7 view) and a continuous circular groove 740, respectively. This allows tool 700 to provide a kinematic coupling with continuously variable adjustability and a high degree of repeatability for a given angular position. In this example, tick marks 724 are provided every 10°. It is noted that in other embodiments having 10° incremented tick marks 724, tool 700 can be configured to provide discrete indexing, i.e., indexing positions located only at the 10° increments. Other features of tool 700 not described can be similar to like features of balance test indexing tools of FIGS. 1-6. The balance test indexing tools of FIGS. 1-6 can include suitable indexing features in the same or similar manner to the manner just described relative to tool 700.

Figure 8A:
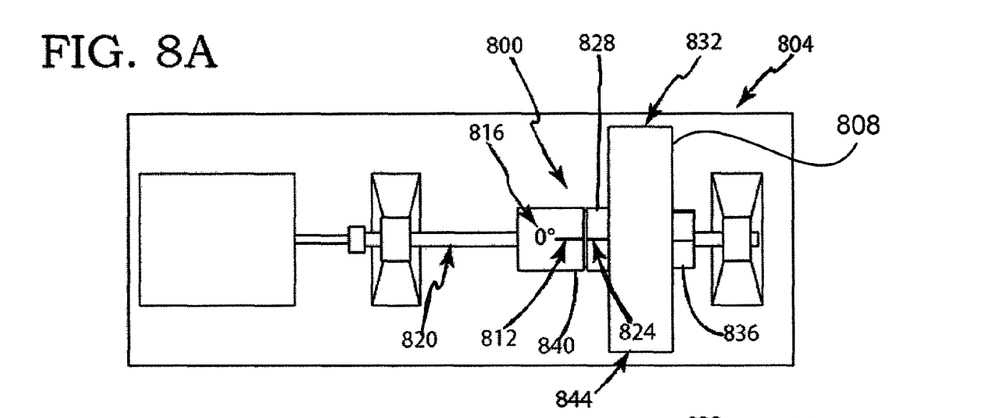
FIG. 8A is a top view of a balancing system showing the rotor indexed to 0° index position of the indexing tool.
Figure 8B:
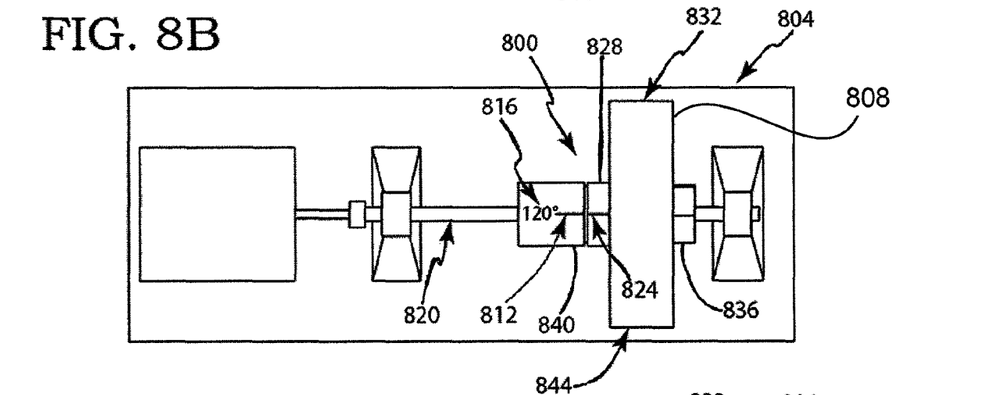
FIG. 8B is a top view of the balancing system of FIG. 8A showing the rotor indexed to 120° index position of the indexing tool.
Figure 8C:
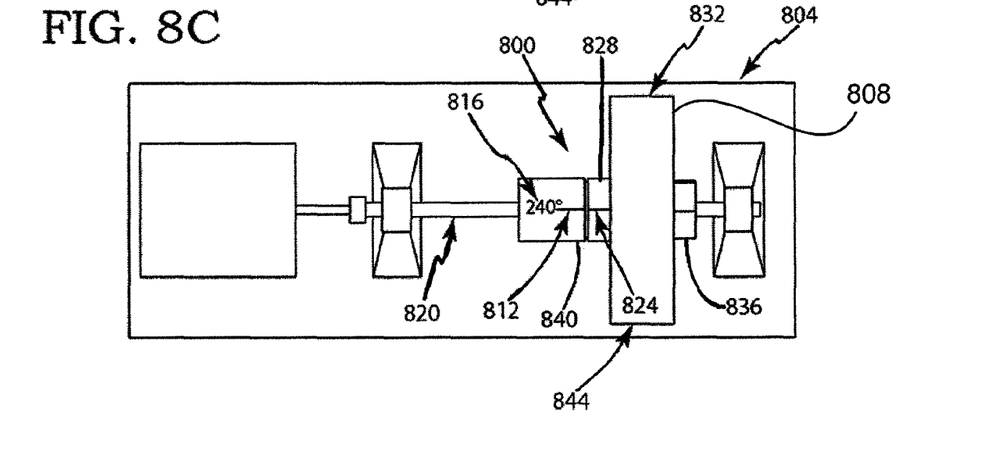
FIG. 8C is a top view of the balancing system of FIGS. 8A-B showing the rotor indexed to 240° index position of the indexing tool.

FIGS. 8A-C and 9 illustrate an example of a method 900 (FIG. 9) of using a balance test indexing tool made in accordance with the present disclosure, such as tool 800 of FIGS. 8A-C. Before describing method 900, the context of the method is first provided. Referring to FIGS. 8A-C, tool 800 is used in a balance testing machine 804 to check rotor 808 for unbalance both before and after the rotor is modified to correct an initially discovered unbalance. Tool 800 in this example is essentially identical to tool 400 of FIGS. 4 and 5, except that tool 800 of FIGS. 8A-C includes visible indexing indicia in the form of tick marks 812 and angle values 816 on rotor mount receiver 820 at the 0°, 120° and 240° index positions and a corresponding alignment mark 824 on rotor mount 828. (Note how tool 400 of FIGS. 4 and 5 includes kinematic coupling features that provide exactly three index positions at 0°, 120° and 240°.) In method 900, the unbalance testing is performed by collecting unbalance data when rotor 808 is in each of the 0°, 120° and 240° index positions.

Figure 9:
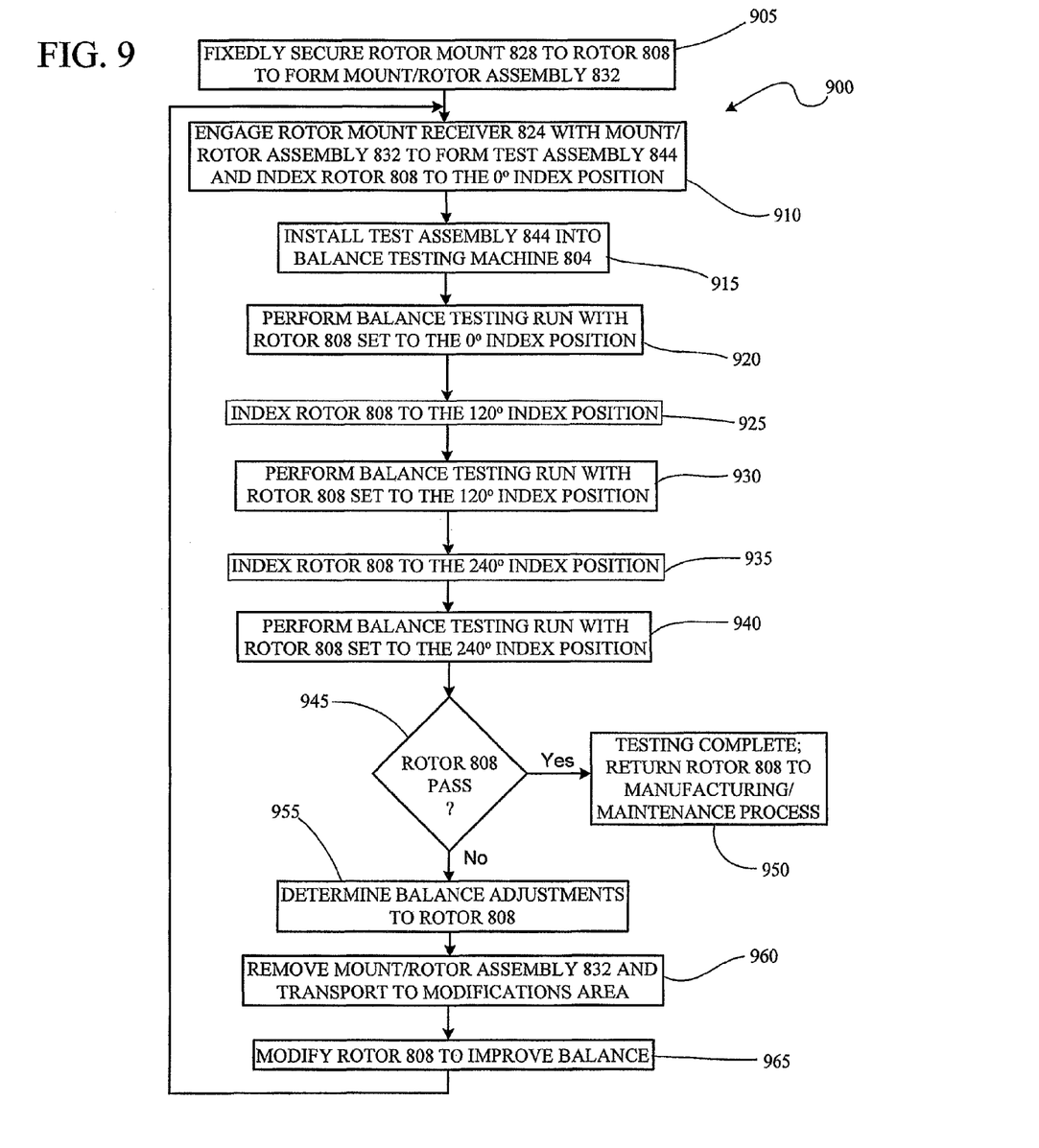
FIG. 9 is a flow diagram illustrating an exemplary balancing process using the balancing system of FIGS. 8A-C.

Referring now to FIG. 9, and also to FIGS. 8A-C as noted, method 900 may begin at step 905 with rotor mount 828 being fixedly secured to rotor 808 to form a mount/rotor assembly 832. While this can be done in any suitable way, in one example this is accomplished using a shrink fit technique. At step 910, rotor mount receiver 824 is engaged with mount/rotor assembly 832 with rotor 808 set to the 0° index position (FIG. 8A), and nut 836 is installed to firmly bias the mount/rotor assembly against the coupling portion 840 of the rotor mount receiver and to create the test assembly 844. At step 915, test assembly 844 is installed into balance testing machine 804, and at step 920 a balancing run is made with rotor 808 set at the 0° index position. Except for the unique way in which rotor 808 is indexed using a balance test indexing tool made in accordance with the present disclosure, the operation of balance testing machine 804 may be the same as the operation of a balance testing machine in any suitable known balancing process. Therefore, a description of step 920 is not necessary for those skilled in the art to practice method 900.

After the balancing run is made with rotor 808 indexed at 0°, at step 925 the rotor is indexed to the 120° index position. This can be accomplished by loosening nut 836, and rotating mount/rotor assembly 832 relative to rotor mount receiver 820, in situ, within balance testing machine 804 until alignment mark 824 on rotor mount 828 is aligned, or nearly aligned, with the tick mark 812 corresponding to the 120° index position (FIG. 8B). Nut 836 is then re-tightened to firmly bias rotor mount 828 into engagement with coupling portion 840 of rotor mount receiver 820 so as to precisely set the indexing by fully engaging the corresponding respective kinematic coupling features. At step 930, a balancing run is made with rotor 808 set at the 120° index position.

After the balancing run is made with rotor 808 indexed at 120°, at step 935 the rotor is indexed to the 240° index position. As before, this can be accomplished by loosening nut 836, and rotating mount/rotor assembly 832 relative to rotor mount receiver 824, in situ within balance testing machine 804, until alignment mark 824 on rotor mount 828 is aligned, or nearly aligned, with the tick mark 812 corresponding to the 240° index position (FIG. 8C). Nut 836 is then re-tightened to firmly bias rotor mount 828 into engagement with coupling portion 840 of rotor mount receiver 820 so as to precisely set the indexing by fully engaging the corresponding respective kinematic coupling features. At step 940, a balancing run is made with rotor set at the 240° index position.

At step 945, it is determined whether or not the results of the balancing runs made at each of the 0°, 120° and 240° index positions indicate that rotor 808 passes the unbalance test. As those skilled in the art know, this can be accomplished, for example, by balance testing machine 804 and/or any suitable unbalance analyzer equipment that can analyze the data collected during the test runs at the differing index positions. If it is determined rotor 808 has passed, at step 950 test assembly 844 is removed from balance testing machine 804, mount/rotor assembly 832 is removed from the test assembly and rotor mount 828 is removed from the rotor. Rotor 808 is now ready to be returned to the manufacturing process of making the machine (not shown) of which the rotor will be a part.

If at step 945 it is determined that rotor 808 does not pass the unbalance test, at step 955 it is determined what adjustments need to be made to the rotor to correct the unbalance. This can be accomplished using any known techniques, such as using balance testing machine 804 and/or data generated from the balancing runs made in steps 920, 930, 940. In this example, it is assumed that the modifications must be made outside of balance testing machine 804, for example, in a special modifications area of the factory. In addition, in this example, modifications are made while rotor mount 828 remains affixed to rotor 808. Consequently, at step 960, test assembly 844 is removed from balance testing machine 804, mount/rotor assembly 832 is disengaged from rotor mount receiver 820 and the rotor mount assembly is transported to the modifications area. At step 965, modifications are made to rotor 808 to correct the unbalance. This can be accomplished using known techniques, such as adding material, removing material, changing out one or more components, shifting of components, adding weights, etc. After rotor 808 has been modified, it is then retested by looping back to step 910. The kinematic coupling of balance test indexing tool 800 permits the retesting to be performed with very high repeatability relative to each preceding unbalance testing of rotor 808.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system, comprising:
   a balance testing machine having a drive mechanism;
   a rotor for a piece of machinery, said rotor being installed in said balance testing machine;
   a balance test indexing tool for assisting with balance testing said rotor in said balance testing machine, said balance test indexing tool coupled between said drive mechanism and said rotor and including:
   a rotor mount fixedly secured to said rotor; and
   a rotor mount receiver coupled between said drive mechanism and said rotor mount;
   wherein said rotor mount and said rotor mount receiver cooperate with one another to provide an indexing coupling between said drive mechanism and said rotor.

2. A system according to claim 1, wherein said indexing coupling is a kinematic coupling.

3. A system according to claim 1, wherein said rotor mount and said rotor mount receiver cooperate to provide a plurality of indexing stops for indexing the rotor relative to said rotor mount receiver.

4. A system according to claim 3, wherein said rotor mount and said rotor mount receiver are configured to allow a user to change the indexing of the rotor while the rotor is mounted in the balance testing machine.

5. A system according to claim 1, wherein said rotor mount receiver comprises a balance testing machine arbor.

6. A system according to claim 1, wherein said rotor mount receiver comprises a balancing simulator.

7. A system according to claim 1, wherein said rotor mount receiver comprises an adaptor plate configured to be mounted to a balance testing machine arbor.

8. A system according to claim 1, wherein the rotor has a rotational axis about which said rotor rotates during operation in the machinery and the system further comprises a securing means for drawing said rotor mount and said rotor mount receiver into engagement with one another in a direction parallel to the rotational axis of the rotor when said balancing tool and the rotor are mounted in the balance testing machine.

9. A rotor balance testing system, comprising:
a drive mechanism;
a rotor to be balance tested; and
a tool removably coupling the rotor to the drive mechanism, said tool comprising:
   a rotor mount disposed on the rotor; and
   a rotor mount receiver disposed on the drive mechanism;
wherein said rotor mount and said rotor mount receiver are configured to form kinematic coupling between said rotor and drive mechanism with said rotor mount and rotor mount receiver being movable relative to one another such that the rotor can be fixed at more than one angular position relative to the drive mechanism.

10. A system according to claim 9, wherein said kinematic coupling forms an indexing coupling.

11. A system according to claim 9, wherein the rotor mount comprises a member fixedly secured to the rotor.

12. A system according to claim 11, wherein said rotor mount receiver comprises an arbor.

13. A system according to claim 11, wherein said rotor mount receiver comprises a dummy rotor.

14. A system according to claim 11, wherein said rotor mount receiver comprises a polar moment inertia device.

15. A system according to claim 11, wherein said rotor mount receiver comprises an adaptor mounted to an arbor.

16. A system according to claim 9, wherein the system further comprises a securing means for fixing the relative positions of said rotor mount and said rotor mount receiver.

17. A system according to claim 16, wherein said securing means provides a securing force with a vector parallel to the rotational axis of the rotor.

* * * * *